(12) United States Patent
Cauligi

(10) Patent No.: US 6,734,987 B1
(45) Date of Patent: May 11, 2004

(54) PRINTER DRIVER FOR GENERATING A REDUCED PRINTER DESCRIPTION FILE

(75) Inventor: Raghothama S. Cauligi, Vancouver, WA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 09/379,831

(22) Filed: Aug. 24, 1999

(51) Int. Cl.[7] .................. G06F 15/00; G06F 13/00
(52) U.S. Cl. ............... 358/1.16; 345/620; 345/621; 345/625; 382/217; 382/218
(58) Field of Search ............... 358/1.15, 1.16; 345/620, 621, 625; 382/217, 218, 294, 241, 203

(56) References Cited

U.S. PATENT DOCUMENTS

| | | | | |
|---|---|---|---|---|
| 5,307,451 A | * | 4/1994 | Clark | 345/427 |
| 5,966,136 A | * | 10/1999 | Kurtz et al. | 345/620 |
| 6,144,458 A | * | 11/2000 | McLachlan et al. | 358/1.15 |
| 6,288,724 B1 | * | 9/2001 | Kumar et al. | 345/621 |

* cited by examiner

Primary Examiner—Edward Coles
Assistant Examiner—Alan Rahimi

(57) ABSTRACT

A printing process for use in a computer system includes process steps to compare a first polygon object to subsequent polygon objects and/or compare a first bitmap to subsequent bitmaps, and to store only the attribute data of the first polygon object and/or attribute data of the first bitmap if the attribute data of the first polygon object is the same as the attribute data of subsequent polygon objects, and attribute data of first bitmap and subsequent bitmaps is the same.

26 Claims, 6 Drawing Sheets

PRINTER DRIVER FOR GENERATING A REDUCED PRINTER DESCRIPTION FILE

FIELD OF THE INVENTION

This invention relates to printer drivers and, in particular, to a printer driver that caches polygons and bitmap images to generate a reduced size printer description file.

BACKGROUND

Personal computers are widely used to print complex documents containing text, graphics and images. The Internet also provides users easy access to thousands of images and compound documents.

Various sophisticated word processing and desktop publishing applications are available to users that can generate complex graphics made up of polygon objects and bitmap images. Polygon objects have three or more sides with regular or irregular shapes. Complex objects, for example, a human face can be divided into a plurality of polygon objects for rendering purposes.

Preparing such complex documents on a computer for printing requires several image-processing operations performed either by the application or by printer driver software normally included with the printer or downloaded from the Internet. As a consequence of incorporating images and complex graphics into a document, today's computer systems are taxed due to processing large amounts of data. Furthermore, large memory storage is needed to store processed documents before they are sent to a printer. Several approaches to document preparation and printing exist.

One such technique is called "spooling" that allows returning the CPU to the user as quickly as possible from a print job. The printer image is spooled as a "spool file" on the computer's hard disk and sent to the printer as a background process only when the CPU is freed from its primary task. This allows the printer driver to return control of the computer back to the user without having to wait for the actual output to be produced.

Windows operating systems (Windows 95 and 98, Microsoft Corp.) use a method known as enhanced metafile format (EMF) spooling. In EMF spooling, the operating system (OS) spools up all of the calls that an application makes to the printer driver and saves the calls in a spool file along with a copy of the data that represents the image. The spooled file is written to a disk. Then the spooled file with the image data is read from the disk and handed to the printer driver.

The printer driver takes the spooled file and creates a high level Printer Description Language File ("PDL file") and stores the PDL file on the disk. The PDL file is sent to the printer engine, processed and printed. If the PDL file is too large, it affects CPU performance and consumes a large amount of disk space.

EMF spooling has not solved all the drawbacks in the present printing systems because a large amount of data is still passed through the system. For example, roughly 20 megabytes of data are needed to represent a typical 24 bit, 8" by 10" image at 300 dpi, and 80 megabytes of data are needed at 600 dpi. Depending upon the complexity of the images, the PDL file can become very large when a user generates polygon objects or bitmaps. This slows down the printing system by taxing the CPU and also uses a lot of memory space.

Hence, what is needed is a method and system that minimizes the amount of data handled by the printer driver, reduces the memory storage space requirements, and eases the demand on the CPU.

SUMMARY

The present invention addresses the foregoing by providing a method that reduces the size of the PDL file and hence reduces memory storage requirement and improves CPU performance during the printing process.

In one embodiment, the present invention concerns a method performed in a printing process by a printer driver for use in a computer system, including process steps to receive a first polygon object, with a corresponding clipping rectangle and corresponding attribute data, and to store attribute data of the first polygon object. Thereafter, the process receives other polygon objects, with corresponding clipping rectangles and attribute data, and compares attribute data of the polygon objects after the first polygon object with the attribute data of the first polygon object. Finally, the process stores the clipping rectangles corresponding to the first polygon object and the polygon objects after the first polygon with same attribute data as the first polygon object, as a linked list.

In another embodiment, the present invention concerns a method performed in a printing process by a printer driver for use in a computer system, including process steps to receive a first bitmap image with a corresponding clipping rectangle and corresponding attribute data, and to store the attribute data of the first bitmap image. Thereafter, the process receives other bitmap images after the first bitmap image, with corresponding clipping rectangles and attribute data, and compares attribute data of bitmap images after the first bitmap image to the attribute data of the first bitmap image. Finally, the process stores the clipping rectangles corresponding to the first bitmap image and the bitmap images with the same attribute data as the first bitmap image, as a linked list.

By virtue of the foregoing aspects of the present invention, PDL file size as processed by the printer driver for a document containing polygon objects and/or bitmap images is reduced. Hence, memory space to store the PDL file is reduced, and CPU performance during the printing process is improved.

This brief summary has been provided so that the nature of the invention may be understood quickly. A more complete understanding of the invention can be obtained by reference to the following detailed description of the preferred embodiments thereof in connection with the attached drawings.

DETAILED DESCRIPTION OF THE PREFERRED EMBODIMENTS

The present invention reduces memory storage space requirements and eases the demand on the CPU by reducing the PDL file size for a printing a computer file. In the preferred technique for a document with arbitrary shapes that can be defined by regular or irregular polygons, the printer driver only stores attribute data for a first polygon object and stores clipping rectangles for the first polygon object and subsequent polygon objects with the same attribute data as the first polygon object.

In the preferred technique for a document containing bitmaps, the printer driver only stores attribute data of a first bitmap image and stores clipping rectangles for the first bitmap image and subsequent bitmap images with the same attribute data as the first bitmap image.

Figure 1:
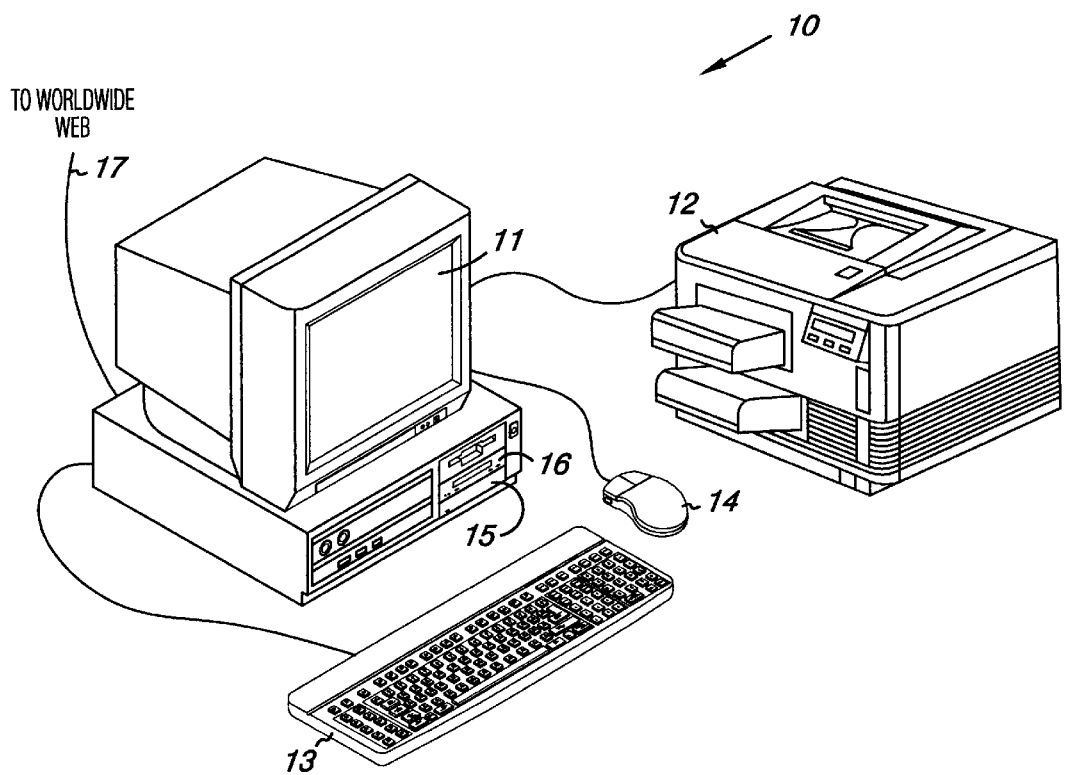
FIG. 1 illustrates a computing system with a computer connected to a printer to carry out the inventive technique.

FIG. 1 is a block diagram of a typical printing system, which includes a host computer 10, a monitor 11, and a printer 12. Monitor 11 may be a CRT type, a LCD type, or any other type of color or monochrome display. Printer 12 may be any type of printer such as an inkjet printer, laser printer, thermal printer, dot matrix, or the like. Computer 10 is also provided with a keyboard 13 for entering text data and user commands, and a pointing device 14 for processing objects displayed on monitor 11.

Computer 10 includes a computer-readable memory medium such as a rotating disk 15 for storing readable data. Besides other programs, disk 15 stores application programs by which computer 10 generates, manipulates and stores files on disk 15, displays data in those files on monitor 11, and prints data in those files via printer 12.

Device drivers are also stored on disk 15. One of the stored device drivers is a printer driver that includes computer-executable process steps according to the present invention. The printer driver provides a software interface to firmware in printer 12, thereby facilitating data transfer between computer 10 and printer 12.

Computer 10 can also access a computer-readable floppy disk storing data files, application program files, and computer executable process steps embodying the present invention or the like via the floppy disk drive 16. A CD-ROM interface (not shown) may also be provided with computer 10 to access application program files, device driver files and data files stored on a CD-ROM.

A modem, an integrated services digital network (ISDN) connection, or the like also provides computer 10 with an Internet connection 17 to the World Wide Web (WWW). The Internet connection 17 allows computer 10 to download device drivers, data files, image files, application program files, and computer-executable process steps embodying the present invention.

Figure 2:
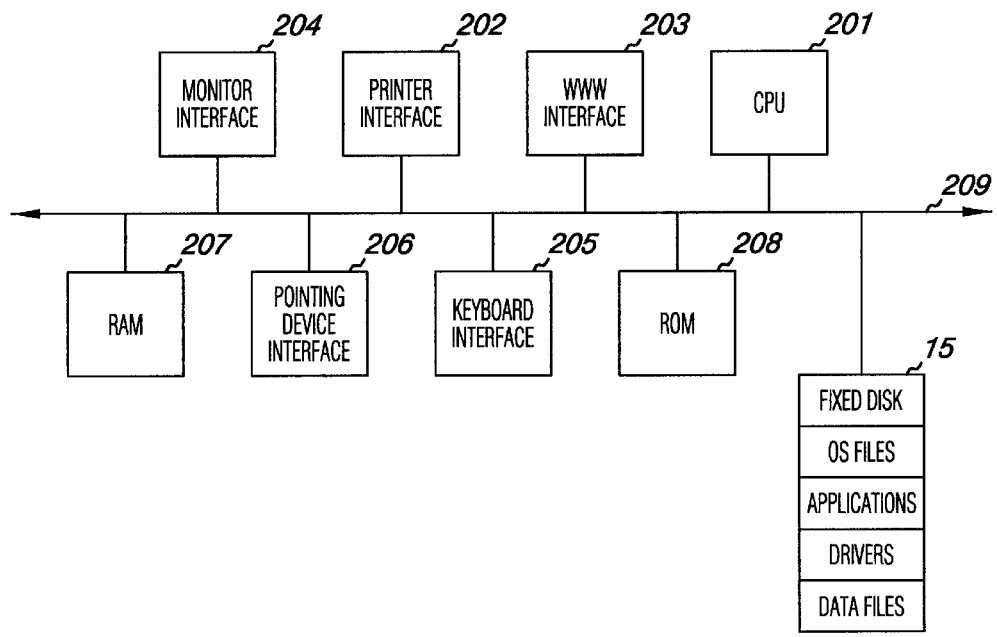
FIG. 2 is a block diagram of the architecture of the computing system of FIG. 1.

FIG. 2 is a block diagram showing the internal functional architecture of computer 10. As shown in FIG. 2, computer 10 includes CPU 201 for executing computer-executable process steps and interfaces with computer bus 209. Also shown in FIG. 2 are printer interface 202, WWW interface 203, display device interface 204, keyboard interface 205, pointing device interface 206 and disk 15.

As described above, disk 15 stores operating system program files, application program files, and device drivers such as a printer driver for printer 12 etc. Some of these files are stored on disk 15 using an installation program. For example, CPU 201 executes computer-executable process steps of an installation program so that CPU 201 can properly execute the application program.

A random access main memory ("RAM") 207 also interfaces to computer bus 209 to provide CPU 201 with access to memory storage. When executing stored computer-executable process steps from disk 15 (or other storage media such as floppy disk 16 or WWW connection 17), CPU 201 stores those process steps in RAM 207 and executes the stored process steps out of RAM 207.

Read only memory ("ROM") 208 is provided to store invariant instruction sequences such as start-up instruction sequences or basic Input/output operating system (BIOS) sequences for operation of keyboard 13.

Most windowing application programs, like Microsoft Word provide a print function to print a particular text file, image file, or other type of data file. Depending upon the application, a user can issue a print command to execute the print function using keyboard 13 and/or pointing device 14. Upon receiving such a print command, the application presents a print window to the user on monitor 11.

Figure 3:
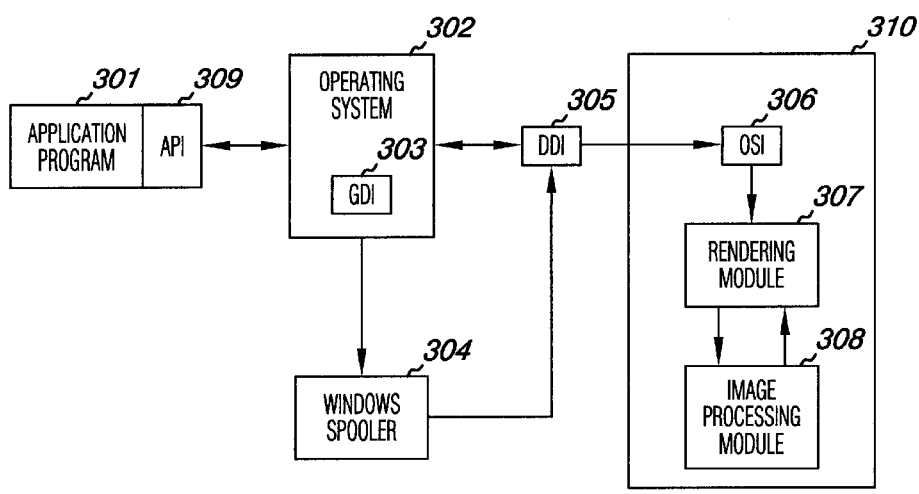
FIG. 3 is a block diagram of the printer driver architecture to carry out the inventive technique.

FIG. 3 is a block diagram of the system according to one embodiment of the present invention. Application program 301 allows a user to create and/or display computer image and text files that include complex shapes which can be defined by polygon objects, and bitmaps. Application program 301 has a print function, which allows a user to input a print command via keyboard 13 or pointing device 14 to print a certain file. When a user selects the print function, application program 301 opens a print menu and sends the print command via an application-programming interface (API) 309, defined by the windows operating system 302 to a graphical device interface ("GDI") 303, a component of the operating system 302. GDI 303 converts the API calls and data into an EMF spool file and transmits the file to Windows spooler 304 that queues the print request.

Windows Spooler 304 sends the EMF file to printer driver 310. Thereafter, a PDL file is generated according to the present invention as shown by the process flow diagram in FIGS. 4 and 5, and sent to rendering module 307. The rendering module 307 sends the PDL file to an image processing module ("IP") 308 that manipulates the PDL file and performs various image processing operations, for example, error diffusion, dithering, half toning and color correction etc. IP module 308 then sends the processed PDL file back to rendering module 307 after the image processing operations. Thereafter, rendering module 307 sends the PDL file to Windows Spooler 304 where the PDL file is queued and is ready to be sent to printer 12 for rendering.

FIRST EMBODIMENT

Figure 4:
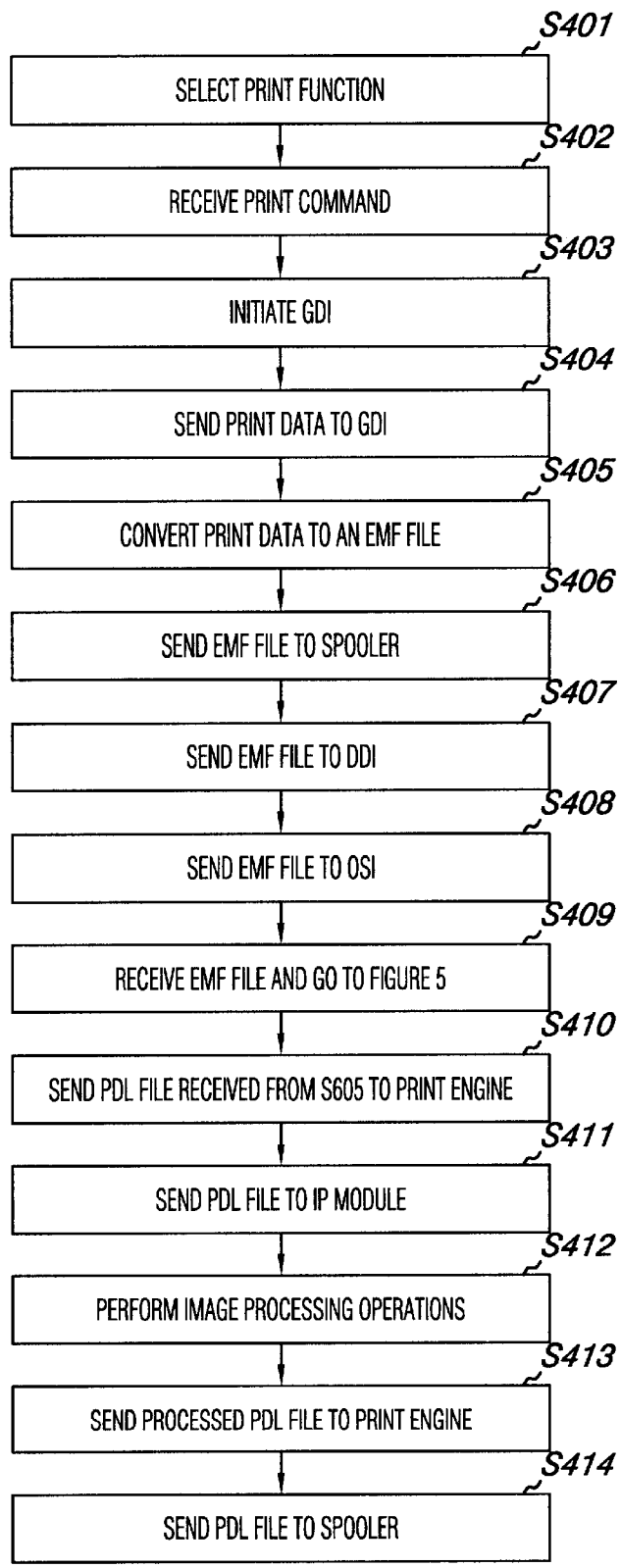
FIG. 4 is a basic flow chart showing computer executable process steps used for creating a PDL file for a print document containing polygon objects.

FIG. 4 is a flow diagram of computer executable process steps according to the first embodiment of the present invention to create a PDL file for a computer file with polygon objects that minimizes memory storage space and improves performance. Preferably, the computer executable process steps are loaded into RAM 207 and executed by CPU 201.

More particularly, flow begins at step S401, in which a user selects a print function to print a computer file with complex objects that can be defined by polygon objects, from computer 10 to printer 12. Application program 301 provides the user with a print screen, and the user inputs print commands either by keyboard 13 or by pointing device 14.

In step S402, API 309 receives the print commands and, in step S403, API 309 initiates GDI 303.

In step S404, API 309 sends the API calls and the print document data including polygon object attributes to GDI 303. The polygon object attributes include LOGBRUSH and LOGPEN object structure information as defined by Microsoft Software Development Kit, 1999 available electronically on the Internet at http://msdn.microsoft.com/library/sdkdoc/and incorporated herein by reference. LOGBRUSH and LOGPEN are functions used to render a polygon object. The polygon object attributes also include co-ordinate information to define the geometry of the polygons and co-ordinates of a clipping rectangle to render a complete image of the polygon. The clipping rectangle defines a region within which certain primitives for example points, lines, and polygons are reproduced.

In step S405, GDI 303 converts the API calls and the print data including the polygon attributes into an EMF file.

In step S406, GDI 304 sends the EMF file to Windows Spooler 304, and the EMF file is queued for processing.

In step S407, Windows Spooler 304 sends the EMF file to DDI 305.

In step S408, DDI 305 sends the EMF file to the Operating System Interface (OSI) 306.

Figure 5:
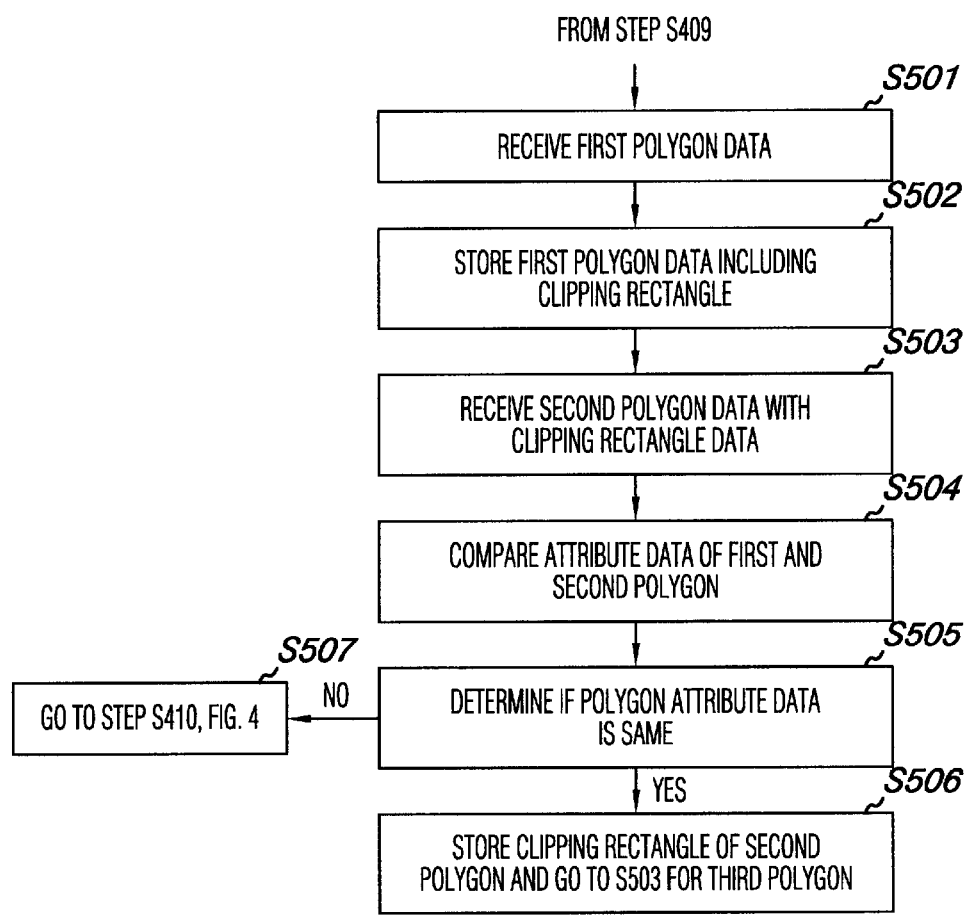
FIG. 5 is a detailed flow diagram showing computer executable process steps for creating a PDL file for a print document containing polygon objects.

In step 409, OSI 306 receives the EMF file and converts the EMF file to a PDL file according to computer executable process steps of the present invention shown in FIG. 5.

Generally, the FIG. 5 process steps include a receiving step to receive a first polygon object with a corresponding clipping rectangle and corresponding attribute data, a storing step to store the attribute data of the first polygon object, a second receiving step to receive other polygon objects following the first polygon object with corresponding clipping rectangles and attribute data, a comparing step to compare the attributes of the polygon objects after the first polygon object with the attribute data of the first polygon object, and a second storing step to store the clipping rectangles corresponding to the first polygon object and the polygon objects following the first polygon object having the same attributes as the first polygon objects, as a linked list.

More particularly, in step S501, OSI 306 receives attributes of the first polygon object including coordinate information defining the boundary of the polygon objects with respect to a fixed frame of reference, LOGBRUSH, and LOGPEN objects for the first polygon.

In step S502, OSI 306 stores the attribute data and the clipping rectangle data for the first polygon object in fixed disk 15 or other similar storage means.

In step S503, OSI 306 receives a second polygon object with corresponding attribute and clipping rectangle data.

In step S504, OSI 306 compares the attribute data of the first and second polygon objects.

In step S505, OSI 306 determines if the polygon object attribute data of the first and second polygon objects are the same.

If the attribute data is the same, then, in step S506, OSI 306 stores the clipping rectangle data of the second polygon object in a linked list with the clipping rectangle data of the first polygon object. Thereafter, OSI 306 receives a third polygon object and the process steps of S503 through S505 are repeated.

It is noteworthy that when the attributes of the first and subsequent polygon objects are the same only the attributes of the first polygon object are saved in memory. Hence memory storage space is minimized.

If attribute data of the first and second polygon objects are different or if the second object is a non-polygon, then in step S507, flow moves to step S410 of FIG. 4.

OSI 306 continues to receive polygon objects, compare attributes and store the corresponding clipping rectangles in a linked list until a non-polygon object or a polygon object with attributes different from the first polygon object is received.

In step S410, OSI 306 sends the linked list and polygon object attributes as a PDL file to rendering module 307.

In step S411, rendering module 307 sends the PDL file to IP module 308.

In step S412, IP module 308 performs various image-processing operations, for example, error diffusion and half-toning etc.

In step S413, the PDL file processed by IP module 308 is sent to rendering module 307.

Finally in step S414, rendering module 307 sends the PDL file to Windows Spooler 310 where the PDL file is queued for rendering by printer 12.

SECOND EMBODIMENT

Figure 6:
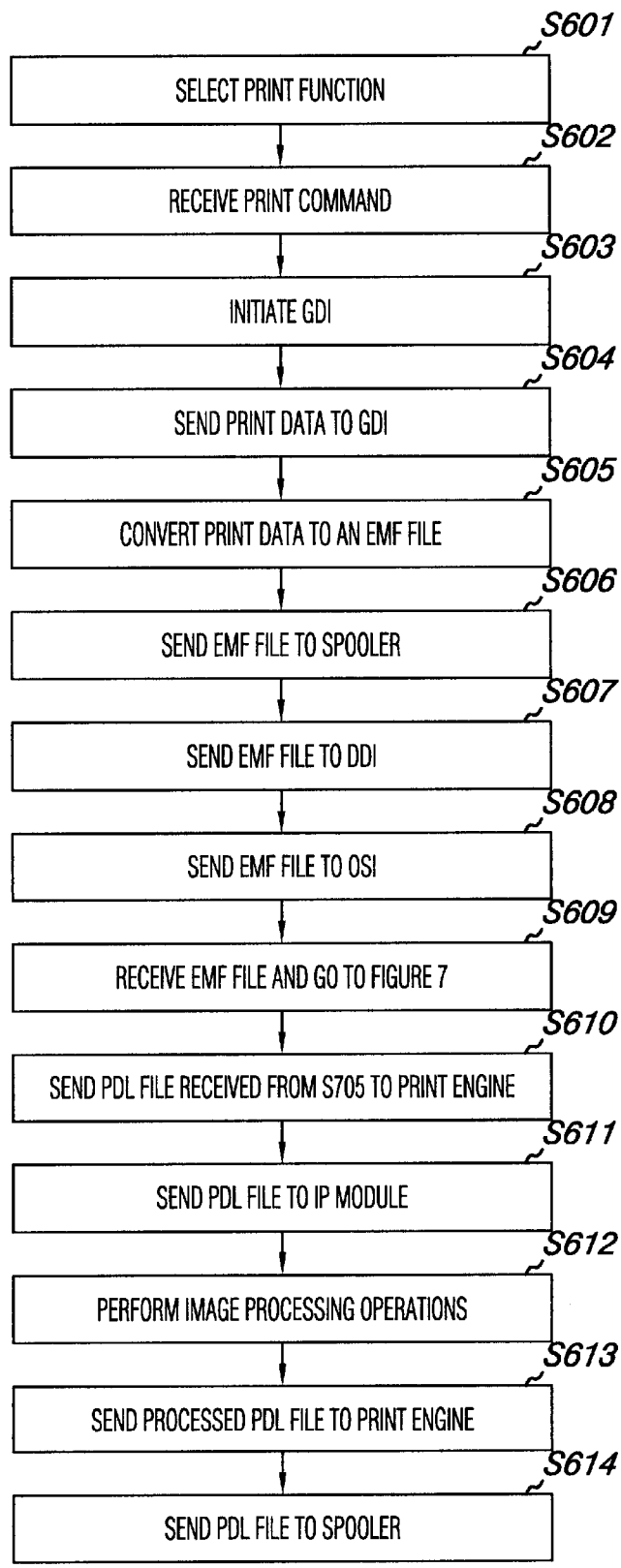
FIG. 6 is a basic flow chart showing computer executable process steps for creating a PDL file for a print document containing bitmaps.

FIG. 6 is a flow diagram of computer executable process steps according to the second embodiment of the present invention to create a PDL file when the print document includes bitmap images. Preferably, the computer-executable process steps are loaded into RAM 207 and executed by CPU 201.

More particularly, flow begins at step S601 in which a user selects the print function to print a document containing bitmap images from computer 10 to printer 12. Application program 301 provides a print screen to input print commands either by keyboard 13 or by pointing device 14.

In step S602, API 309 receives the print commands from the user and, in step S603, API 309 initiates GDI 303.

In step S604, API 309 sends the API calls and the print data including the bitmap image data to GDI 303.

In step S605, GDI 303 converts the API calls and the print document data into an EMF file.

In step S606, GDI 303 sends the EMF file to Windows Spooler 304, and the EMF file is queued for processing.

In step S607, Windows Spooler 304 sends the EMF file to printer driver 310 through DDI 305.

In step S608, OSI 306 receives the EMF file from DDI 305.

Figure 7:
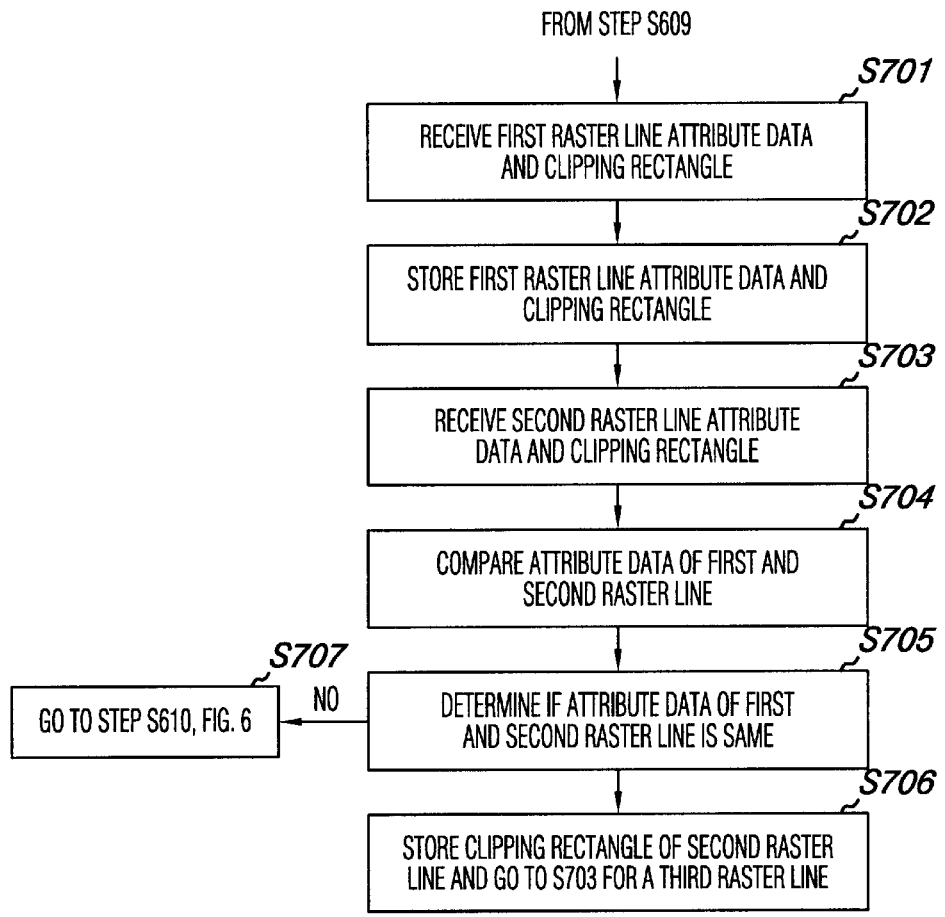
FIG. 7 is a detailed flow diagram showing computer executable process steps for creating a PDL file for a print document containing bitmaps.

In step S609, OSI 306 receives and converts the EMF file to a PDL file according to the computer executable process steps of the present invention shown in FIG. 7.

Generally, the FIG. 7 process steps include a receiving step to receive a first bitmap image with a corresponding clipping rectangle and corresponding attribute data, a storing step to store the attribute data of the first bitmap image, a second receiving step to receive bitmap images after the first bitmap image with corresponding clipping rectangles and attribute data, a comparing step to compare the attribute data of the bitmap images after the first bitmap image to the attribute data of the first bitmap image, and a second storing step to store the clipping rectangles of the first bitmap image and the bitmap images following the first bitmap image with same attribute data, as a linked list.

More particularly, in step S701, OSI 306 receives attribute data including size, address and pixel values of pixels in the first bitmap image, and a clipping rectangle corresponding to the first bitmap image.

In step S702, OSI 306 stores the size, address and pixel values of the pixels in the first bitmap image and the clipping rectangle corresponding to the first bitmap image.

In step S703, OSI 306 receives a second bitmap image with a corresponding clipping rectangle and attribute data.

In step S704, OSI 306 compares the attributes of the second bitmap image with that of the attributes of the first bitmap image. According to one embodiment of the present invention, instead of comparing every pixel of the second bitmap image to every pixel in the first bitmap image, the second bitmap image pixels are sampled and compared to pixels with corresponding addresses in the first bitmap image. For example, a few pixels at the beginning, middle and end of the second bitmap image are compared to the pixels with the corresponding address in the first bitmap image. One technique for selectively comparing bitmaps is to use the "Dword" capability of a Pentium (Intel Inc.) processor that allows a 32-bit comparison. By selectively comparing the bitmap pixels, the present invention saves memory space and improves performance In step S705, OSI 306 determines if the attributes of the second and first bitmap images are the same.

If the attributes in step S705 are the same, then in step S706, OSI 306 stores the second clipping rectangle as a part of a link list with the clipping rectangle corresponding to the first bitmap image on fixed disk 15. Thereafter, OSI 306 receives a third bitmap image and repeats the steps S703 through S706. If the attributes of the first and second bitmap image are different, then flow moves to step S610 of FIG. 6.

In step S610, OSI 306 sends the PDL file that includes bitmap information of the bitmap images identical to that of the first bitmap image and the linked list of the clipping rectangles to rendering module 307.

In step S611, rendering module 307 sends the PDL file to IP Module 308.

In step S612, IP module 308 performs various image-processing operations for example error diffusion and half-toning etc.

In step S613, the IP module 308 sends the processed PDL file to rendering module 307, and in step S514, rendering module 307 sends the PDL file to Windows Spooler 310 where it is queued and is ready to be sent to the printer for rendering.

OSI 306 performs operations similar to those described above in steps S608 to S613 on subsequent bitmap images with bitmap image information is different than the first bitmap image, until all the bitmap images are processed and converted into a PDL file.

By virtue of the foregoing aspects of the present invention, PDL file size as processed by the printer driver for a document containing polygon objects and/or bitmaps is reduced because common polygon object and/or bitmap image attributes are only stored once. Hence, memory space to store the PDL file is reduced, and CPU performance during the printing process is improved.

Although the present invention has been described with reference to specific embodiments, these embodiments are illustrative only and not limiting. Many other applications and embodiments of the present invention will be apparent in light of this disclosure and the following claims.

What is claimed is:

1. A method performed in a printing process, comprising the steps of:

receiving a first polygon object with a corresponding clipping rectangle data and a plurality of corresponding attribute data;

storing the attribute data and the clipping rectangle data of the first polygon object;

receiving a plurality of polygon objects after the first polygon object with corresponding clipping rectangle data and plurality of corresponding attribute data;

comparing the attributes of the plurality of polygon objects after the first polygon object with the attribute data of the first polygon object;

determining if the attribute data of the first polygon object and the plurality of polygon objects after the first polygon object are the same; and storing the clipping rectangles of the plurality of polygon objects after the first polygon objects with the same attribute data as the first polygon objects, as a linked list that lists objects having the same attribute data as the first polygon object and links the list to the first polygon object.

2. The method according to claim 1, further comprising the step of:

sending the attribute data and clipping rectangle data corresponding to the first and the plurality of subsequent polygon objects to a image processing module, after receiving a polygon object with attribute data different than the attribute data of the first polygon object.

3. The method according to claim 1, further comprising the step of:

sending the attribute data and the clipping rectangle data corresponding to the first polygon object and subsequent polygon objects with the same attribute data as the first polygon object, to the image-processing module, after a non polygon object is received following the first polygon object.

4. The method according to claim 1, wherein the attribute data corresponding to the polygon objects includes coordinate information for defining the geometry of the corresponding polygon object.

5. The method according to claim 1, wherein the attribute data includes LOGPEN and LOGBRUSH object data for rendering the polygon objects.

6. The method according to claim 1, wherein the attribute data and the clipping rectangle data are stored on a fixed disk.

7. A method performed in a printing process, comprising the steps of:

receiving a first bitmap image with a corresponding clipping rectangle data and a plurality of corresponding attribute data;

storing the attribute data and the clipping rectangle data of the first bitmap image;

receiving a plurality of bitmap images after the first bitmap image with corresponding clipping rectangle data and plurality of corresponding attribute data;

comparing the attributes of the plurality of bitmap images after the first bitmap image with the attribute data of the first bitmap image;

determining if the attribute data of the first bitmap image and the subsequent bitmap images are the same; and storing the clipping rectangles of the plurality of bitmap images following the first bitmap image having the same attribute data as the first bitmap image, as a linked list that lists objects having the same attribute data as the first polygon object and links the list to the first polygon object.

8. The method according to claim 7, further comprising the step of:

sending the first bitmap image attribute data, and the clipping rectangles data for the first and the plurality of subsequent bitmap images to a image processing module, after receiving a bitmap image with attribute data different from the attribute data of the first bitmap image.

9. The method according to claim 7, further comprising the step of:

sending the first bitmap image attribute data and the clipping rectangle data corresponding to the first bitmap image and subsequent bitmap images with the same attribute data as the first bitmap image, to the image processing module after receiving a non bitmap image object.

10. The method according to claim 7, wherein the attribute data includes pixel values for the pixels in the bitmap image.

11. The method according to claim 7, wherein the attribute data includes pixel address of the pixels of the bitmap image.

12. The method according to claim 7, wherein the attribute data and the clipping rectangle data are stored on a fixed disk.

13. The method according to claim 7, wherein a sample of pixels in the bitmap images after the first bitmap image are compared to pixels in the first bitmap image with a corresponding address.

14. A computer-readable medium storing computer-executable process steps of a printing process for use in a computer system, the steps comprising of:

receiving a first polygon objects with a corresponding clipping rectangle data and a plurality of corresponding attribute data;

storing the attribute data and the clipping rectangle data of the first polygon object;

receiving a plurality of polygon objects after the first polygon object with corresponding clipping rectangle data and plurality of corresponding attribute data;

comparing the attributes of the plurality of polygon objects after the first polygon object with the attribute data of the first polygon object;

determining if the attribute data of the first polygon object and the plurality of polygon objects after the first polygon object are the same; and storing the clipping rectangles of the plurality of polygon objects following the first polygon object, with the same attribute data as the first polygon object, as a linked list that lists objects having the same attribute data as the first polygon object and links the list to the first polygon object.

15. The computer readable medium according to claim 14, further comprising the step of:

sending the attribute data and clipping rectangle data corresponding to the first and the plurality of subsequent polygon objects to a image processing module, after receiving a polygon object with attribute data different from the attribute data of the first polygon object.

16. The computer readable medium according to claim 14, further comprising the step of:

sending the attribute data and the clipping rectangle data corresponding to the first polygon object and subsequent polygon objects with the same attribute data as the first polygon object, to the image-processing module, after a non polygon object is received following the first polygon object.

17. The computer readable medium according to claim 14, wherein the attribute data corresponding to the polygon objects includes coordinate information for defining the geometry of the corresponding polygon object.

18. The computer readable medium according to claim 14, wherein the attribute data includes LOGPEN and LOGBRUSH object data for rendering the polygon objects.

19. The computer readable medium according to claim 14, wherein the attribute data and the clipping rectangle data are stored on a fixed disk.

20. A computer-readable medium storing computer-executable process steps of a printing process for use in a computer system, the steps comprising of:

receiving a first bitmap image with a corresponding clipping rectangle data and a plurality of corresponding attribute data;

storing the attribute data and the clipping rectangle data of the first bitmap image;

receiving a plurality of bitmap images after the first bitmap image with corresponding clipping rectangle data and plurality of corresponding attribute data;

comparing the attribute data of the plurality of bitmap images after the first bitmap image with the attribute data of the first bitmap image;

determining if the attribute data of the first bitmap image and the subsequent bitmap images are the same; and storing the clipping rectangles of the plurality of bitmap images following the first bitmap image, having the same attribute data as the first bitmap image, as a linked list that lists objects having the same attribute data as the first polygon object and links the list to the first polygon object.

21. The computer readable medium according to claim 20, further comprising of:

sending the attribute data and clipping rectangles data for the first and the plurality of subsequent bitmap images to a image processing module, after receiving a bitmap image with attribute data different than the attribute data of the first bitmap image.

22. The computer readable medium according to claim 20, further comprising the step of:

sending the attribute data and the clipping rectangle data corresponding to the first bitmap image and subsequent bitmap images with the same attribute data as the first bitmap image, to the image processing module, after a non bitmap image object is received following the first bitmap image.

23. The computer readable medium according to claim 20, wherein the attribute data includes pixel values for the pixels in the bitmap images.

24. The computer readable medium according to claim 20, wherein the attribute data includes pixel address of the pixels in the bitmap images.

25. The computer readable medium according to claim 20, wherein the attribute data and the clipping rectangle data are stored on a fixed disk.

26. The computer readable medium according to claim 20, wherein a sample of pixels in the bitmap images after the first bitmap image are compared to pixels in the first bitmap image with a corresponding address.

* * * * *